United States Patent
McDaniel et al.

(10) Patent No.: US 7,595,281 B2
(45) Date of Patent: Sep. 29, 2009

(54) METHODS TO INCREASE RECOVERY OF TREATMENT FLUID FOLLOWING STIMULATION OF A SUBTERRANEAN FORMATION COMPRISING IN SITU FLUOROCARBON COATED PARTICLES

(75) Inventors: Billy W. McDaniel, Duncan, OK (US);
Billy F. Slabaugh, Duncan, OK (US);
Lyle V. Lehman, Katy, TX (US);
Jimmie D. Weaver, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 550 days.

(21) Appl. No.: 11/132,022

(22) Filed: May 18, 2005

(65) Prior Publication Data

US 2006/0264333 A1 Nov. 23, 2006

(51) Int. Cl.
*C09K 8/588* (2006.01)
*C09K 8/62* (2006.01)
*E21B 43/267* (2006.01)

(52) U.S. Cl. .................... 507/205; 166/308.1; 166/306; 507/221

(58) Field of Classification Search ................ 507/205, 507/221; 166/308.1, 306
See application file for complete search history.

(56) References Cited

U.S. PATENT DOCUMENTS

| 4,733,729 A * | 3/1988 | Copeland .................... 166/276 |
| 5,229,017 A | 7/1993 | Nimerick et al. ......... 252/8.551 |
| 5,330,005 A | 7/1994 | Card et al. .................. 166/280 |
| 5,439,055 A | 8/1995 | Card et al. .................. 166/280 |
| 5,501,275 A | 3/1996 | Card et al. .................. 166/280 |
| 5,551,516 A | 9/1996 | Norman et al. ............. 166/308 |
| 5,775,415 A | 7/1998 | Yoshimi et al. ............. 165/202 |
| 5,787,986 A | 8/1998 | Weaver et al. ................ 166/280 |
| 5,833,000 A | 11/1998 | Weaver et al. ............... 166/276 |
| 5,839,510 A | 11/1998 | Weaver et al. ............... 166/276 |
| 5,853,048 A | 12/1998 | Weaver et al. ............... 166/279 |
| 5,871,049 A | 2/1999 | Weaver et al. ............... 166/276 |
| 6,047,772 A | 4/2000 | Weaver et al. ............... 166/276 |
| 6,439,309 B1 | 8/2002 | Matherly et al. ............ 166/276 |
| 6,660,692 B1 | 12/2003 | Hewett ....................... 504/130 |
| 2001/0001696 A1 * | 5/2001 | Tai et al. ........................ 430/26 |
| 2005/0244641 A1 * | 11/2005 | Vincent ..................... 428/403 |
| 2006/0243441 A1 * | 11/2006 | de Grood et al. ......... 166/280.2 |

FOREIGN PATENT DOCUMENTS

EP 0 853 186 7/1998

OTHER PUBLICATIONS

Foreign communication related to a counterpart application dated Oct. 9, 2006.

* cited by examiner

*Primary Examiner*—Timothy J. Kugel
(74) *Attorney, Agent, or Firm*—Robert A. Kent; Booth Albanesi Schroeder LLC

(57) ABSTRACT

The invention provides a method of treating a subterranean formation penetrated by a wellbore, the method comprising the steps of: (a) mixing a particulate and an active material to obtain an at least partially coated particulate, wherein: (i) water forms a contact angle of less than 90 degrees with a surface of the particulate, (ii) the active material is capable of forming a coating on the particulate, (iii) the active material forms a contact angle less than 90 degrees with the particulate, and (iv) water forms a contact angle of greater than 90 degrees with a layer of the active material; (b) mixing the at least partially coated particulate and a carrier fluid to obtain a treatment fluid; and (c) introducing the treatment fluid into the subterranean formation through the wellbore to deposit the at least partially coated particulate into the subterranean formation.

13 Claims, No Drawings

METHODS TO INCREASE RECOVERY OF TREATMENT FLUID FOLLOWING STIMULATION OF A SUBTERRANEAN FORMATION COMPRISING IN SITU FLUOROCARBON COATED PARTICLES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The invention generally relates to methods to treat a subterranean formation to enhance hydrocarbon (oil and/or gas) production from a well. More specifically, the invention is directed to methods to increase recovery of stimulation treatment fluids and prevent or minimize damage to the permeability of the reservoir rock, natural fractures, or hydraulic fractures that might otherwise result from exposure to a treatment fluid used in a subterranean formation.

BACKGROUND OF THE INVENTION

One set of techniques to maximize hydrocarbon production is referred to as "stimulation." Stimulation procedures are usually performed on production wells completed in oil and/or gas containing formations; however, injection wells used in secondary or tertiary recovery operations can also be fractured to facilitate the injection of the fluids.

One stimulation technique is hydraulic fracturing. Hydraulic fracturing involves injecting a fracturing fluid into the wellbore directed at the face of a hydrocarbon bearing geologic formation at pressures sufficient to initiate and extend a crack or cracks (fractures) in the formation. The continued pumping of the fracturing fluid extends the fractures. A proppant, such as sand or other particulate material, can be suspended in the fracturing fluid and introduced into the created fractures. The proppant material holds or "props" open the fracture and prevents the formed fractures from closing upon reduction of the hydraulic pressure. In this way, conductive channels remain through which produced fluids can readily flow to the wellbore upon completion of the fracturing treatment.

Thus, the purpose of the fracturing fluid generally is twofold: (1) to create a fracture(s) or extend an existing fracture(s) through high-pressure introduction of fluid into the geologic formation; and (2) to leave said crack(s) as conductive flow paths for the purpose of increasing hydrocarbon flow to the wellbore, or to improve the inductivity of some fluid into the reservoir rock. This is most typically accomplished by the transporting of some type of solid proppant into the fracture void space created by the fluid injection so that the proppant can prevent complete closure of the fracture(s) and create a porous channel through which fluid can more easily flow to (or from) the wellbore. For placing proppants into the fracture(s), the fracturing fluid of choice will often have a high viscosity to retain a proppant material in suspension (or semi-suspension) in order to help carry the proppant away from the wellbore into the created fracture(s). In some cases, a fracturing fluid may be at least partly composed of some type of chemical or additive that will dissolve a part of the formation rock along the wall of the fracture(s) to yield the benefit of creating an open flow path for production or injection of fluids (i.e., such as an acid dissolving a carbonate rock).

The basic component of the fracturing fluid is usually water, in which case it is an aqueous fracturing fluid, although other liquids and gases can also be included in the fluid. Water, as well as many of the other possible fracturing fluids, lacks adequate viscosity to suspend a proppant for very long, thereby depending mostly on fluid velocity as the dominant proppant transport mechanism. To increase the viscosity of the fluid, a viscosifying (thickening) agent is commonly used in a fracturing fluid. A fluid with a high-molecular weight system can form a viscous fluid or gel. Commonly used viscosifying agents include polymers, many of which are selected because they can be crosslinked to selectively form very high molecular weight systems. The most common viscosifying agent currently is guar, or some derivative of guar.

Once the proppant is transported into the fracture, it is then desirable to remove the viscosified fracturing fluid from the fracture. The process of removing the viscous fluid from the fracture after the suspended proppant in the viscous fluid has been transported into the fracture is sometimes referred to as "fracture clean-up."

When a polymer or a crosslinked polymer is used as a viscosifying agent, a chemical additive, known in the art as a breaker, is normally also used, which is capable of at least partially destroying the crosslinking, partially degrading the polymer itself, or both. The purpose of the breaker is to lower the viscosity of the fluid so that it is more easily removed from the fracture, and to also remove any partially broken remnants of polymers or other additives used to viscosify the fracturing fluid by flow back to the wellbore during the clean-up or production periods. Once the polymers are broken down by the breaker and are reverted into a low viscosity fluid, the broken down carrier fluid is flowed back to remove it from the formation.

However, some broken down polymers and other materials that make up the fracturing fluid tend to adhere to the proppant and/or the formation. These materials tend to hold water and therefore occupy a significant volume. The result of these partially hydrated stagnant fracturing fluid components that surround the proppant within the fracture porosity and within the formation diminishes their permeability to hydrocarbons, acting as a restriction or barrier to hydrocarbon migration from the formation into the fracture and on to the wellbore. Additionally, this fluid saturation of the pore spaces is further compounded by adhesive or cohesive forces that cause the residue to be more difficult to dislodge, and the fluid-saturated zones restrict or prevent hydrocarbon flow to the wellbore. The rate of flow of hydrocarbon production from a formation is naturally dependent on numerous reservoir factors such as reservoir pressure, permeability, and hydrocarbon fluid viscosity. The contamination of the formation porosity and the fracture porosity by broken down polymers and other materials of the fracturing fluid is sometimes referred to as decreasing the effective fracture length. If a portion of the propped fracture cannot flow or "clean up" adequately, the net result is a portion of the propped fracture length is ineffective and does not contribute adequately to production, and the apparent result is that the "effective" portion of the propped fracture is less that the actual propped fracture length. The "trapped" fracturing fluid in the fracture is harmful to hydrocarbon production since it plugs the fracture and therefore impedes the flow of hydrocarbon.

Most efforts to address the problem of stagnant fracturing fluid in the fracture or formation that damages the permeability of hydrocarbon have focused on achieving a greater degree of degradation of high molecular weight polymers and/or the crosslink sites. Some of these high molecular-weight polymers typically contain insoluble or partially soluble materials that tend to serve as filler in the formation or fracture porosity after breaking the fracturing fluid (viscosity reduction). Sometimes, a breaker is used to destroy the molecular backbone of these polymers and reduce their molecular weight, rendering them ineffective in viscosifying the water, much smaller in size, and easier to move through the porosity and be removed from the porosity. Historically, less than 50% of the gel polymer of a stimulation treatment is returned to the surface during post-treatment cleanup.

Some efforts to address the problem of stagnant fracturing fluid in the formation have focused on finding a viscosifying agent that can be effective at a lower concentration to viscosity the fracturing fluid. According to this theory, if it were possible to use a lower concentration of a viscosifying agent, then a lower concentration of insoluble material would be present that requires breaking and would leave less residue in the formation after breaking. Still, reducing the concentration of the viscosifying agent has not always been found to be practical. Currently, the available viscosifying agents that might be effective at significantly lower concentration than traditional agents such as guar are far too costly, and still cannot provide adequate viscosity under downhole conditions regardless of higher cost.

Other efforts have focused on the development of thickening additives that do not form permanent bonds between the base chemical additives. This would theoretically allow for smaller sized structures, e.g., on the order of microscopic in size, to improve the ability of the material to flow back out of the fracture and/or the proppant pack.

Still other efforts to address the problem of stagnant fracturing fluid in the formation have focused on using a surfactant-based viscosifying agent rather than polymers such as guar to viscosify fracturing fluids. These viscosifying surfactants are selected to have low adhesion to proppant, thereby facilitating recovery of the fracturing fluid from the formation after the formation is fractured. For example, a system that does not use conventional guar-based polymers to viscosify the fracturing fluid is disclosed in U.S. Pat. No. 5,551,516, issued Sep. 3, 1996 to Schlumberger Technology Corporation. This patent discloses a viscoelastic surfactant based aqueous fluid systems that are useful in fracturing subterranean formations penetrated by a wellbore. The preferred thickening agents are quaternary ammonium halide salts derived from certain waxes, fats and oils. The thickening agent is used in conjunction with an inorganic water soluble salt such as ammonium chloride or potassium chloride, and an organic stabilizing additive selected from the group of organic salts such as sodium salicylate. The resulting fluids are claimed to be stable to a fluid temperature of about 225 degrees F. See U.S. Pat. No. 5,551,516, Abstract. Such a viscoelastic surfactant system is claimed to flow back the fracturing fluid more effectively after delivering the proppant due to lower molecular weight (size). However, these surfactant-based fracturing fluids are highly costly compared to conventional guar-based fracturing fluids and often have excessive leak-off into the formation porosity. They also require contact with liquid hydrocarbons to begin their breaking process, and in cases of dry gas reservoirs, these frac fluids have been known to not break at all. In these cases and as a preventative, a mutual solvent usually ethylene glycol mono butyl ether (EGMBE) or similar solvent is added as pre-flush to encourage breaking of these viscoelastic materials.

In addition, U.S. Pat. No. 6,439,309 issued Aug. 27, 2002 discloses silyl-modified polyamides, and subterranean formation treatments employing silyl-modified polyamides to minimize migration or movement of solid particulates within a subterranean formation and/or within a wellbore penetrating a subterranean formation. U.S. Pat. No. 6,439,309, Abstract. These coatings are described as being self-hardening to a substantially non-tacky state to which additional individual particulates will not adhere and to have a substantially pliable in situ elastic modulus under downhole conditions.

Thus, there has been a long-felt need for improved fluids and methods for more completely removing the guar-based fracturing fluids from the formation.

SUMMARY OF THE INVENTION

The invention is directed primarily to compositions and methods for improved recovery of the fracturing fluid from the formation and proppant pack. The invention provides a method of treating a subterranean formation penetrated by a wellbore, the method comprising the steps of: (a) mixing a particulate and an active material to obtain an at least partially coated particulate, wherein: (i) water forms a contact angle of less than 90 degrees with a surface of the particulate, (ii) the active material is capable of forming a coating on the particulate, (iii) the active material forms a contact angle less than 90 degrees with the particulate, and (iv) water forms a contact angle of greater than 90 degrees with a layer of the active material; (b) mixing the at least partially coated particulate and a carrier fluid to obtain a treatment fluid; and (c) introducing the treatment fluid into the subterranean formation through the wellbore to deposit the at least partially coated particulate into the subterranean formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope and spirit of the invention as expressed in the appended claims.

DETAILED DESCRIPTION OF CURRENT MOST PREFERRED EMBODIMENTS AND CURRENT BEST MODE

As mentioned previously, stagnant treatment fluid in a formation results in reduced hydrocarbon recovery from the formation through a proppant or gravel pack. Without being limited by theoretical explanation, it is believed that stagnant treatment fluid in the formation is at least partially due to the aqueous treatment fluid adhering to water-wet particulate in the proppant or gravel pack. For example, a gel-based fracturing fluid is an aqueous treatment fluid that includes viscosifying polymers, breakers, buffers, surfactants, clay stabilizers, scale inhibitors, friction residue, etc. The permeability of such aqueous components through a proppant bed or gravel pack is hindered by the water-wet nature of the particulate used for the proppant or gravel pack.

The invention provides mixing the particulate and the active material to obtain an at least partially coated particulate. While being mixed with the particulate, the active material is capable of forming an oil-wet coating on the particulate. Without being limited by theory, it is believed that the oil-wet coating on the particulate facilitates the movement of aqueous treatment fluid through the particulate because the aqueous phase treatment fluid will not adhere to the oil-wet coating of the particulate. The permeability of an aqueous treatment fluid through particulate increases when the aqueous fluid is not "bound" to the particulate and, therefore, becomes more mobile through the particulate in the formation. Thus, the flow resistance of the aqueous treatment fluid through the formation is lowered. In this way, the treatment fluid can reach and treat areas intended in the formation without being bound by a gravel pack that is made up of particulate coated by the active material.

In fracturing treatment fluids, the flow back of the treatment fluid is facilitated after breaking the fracturing fluid by using the active-material coated proppants, because the fracturing fluid is not bound to the proppant bed that is made up of active material-coated proppants. Thus, because the oil-wet coating on the proppants diminishes or prevents residual frac fluid from coating the proppants, the permeability of the fracturing fluid through the proppant bed is increased. By increasing the permeability of the fracturing fluid through the proppant bed, the load recovery tendencies of the fracturing fluid are improved, thereby improving well production by reducing plugging materials such as base fluid and viscosifying polymers of the fracturing fluid.

Wettability describes how a fluid adheres to a surface. When more than one fluid is present in a permeable system, the flow of each is affected by the amount and distribution of the other(s). The relative flow(s) through particulate is affected by which fluid is the "wetting" phase, that is, the fluid that preferentially tends to coat the surfaces of the particulate. One standard quantitative technique for measuring the wettability of a material is the contact angle method. A liquid droplet placed on a solid, substantially non-absorbent surface will reach an 'equilibrium' condition where no further spreading of the droplet occurs. The contact angle reading, which is determined at this condition, is the 'static' contact angle. For high viscosity liquids (e.g., glycerin) it is necessary to wait until the spreading stops before a reading is determined. It is important the droplet is applied gently on the specimen surface in order to measure a contact angle, which is as high as possible. If the droplet is pushed into the surface, the droplet will spread out and the contact angle will become lower as the droplet retracts on the surface. Static contact angle cannot be used when the test liquid penetrates into the substrate.

For a formation, a proppant, and a gravel pack, wettability plays a major role in defining how hydrocarbon and water coexist in the pores and, therefore, influence numerous properties such as relative permeability of fluids. In uniformly wetted formations, the relative permeability to one fluid increases as the system becomes more wetted by the other fluid. As used herein, "water-wet" is tested by measuring the static contact angle of water, such as distilled water, on the surface to be tested. If the contact angle is less than 90 degrees, the surface of the material is considered to be water wet.

The particulate for use in the invention can comprise substantially any material having sufficient compressive strength to function in proppant or gravel packing, as the case may be. The particulate also is of a material that does not undesirably chemically interact with other components used in treating the formation. The particulates that have been commonly used for proppant or gravel packing are typically water-wet prior to mixing the particulate with the active material. Preferably, the surface of the particulate for use in the present invention has the property of being impenetrable by water, such as distilled water. More preferably, water, such as distilled water, forms a contact angle of less than 90 degrees with the surface of the particulate.

The particulate, for example, can be selected from the group consisting of sand, sintered bauxite, ceramic, glass, and any combination in any proportion thereof. Such particulates are water-wet when tested with water, such as distilled water. However, it is also contemplated that other particulates that are of mixed wettability can be used. A particulate of mixed wettability has both water-wet and oil-wet properties. The particulate, for example, can be present in the treatment fluid in an amount in the range of from about 0.1 to about 24 pounds of particulate per gallon of the treatment fluid. The size of the particulate, for example, can be in the range of 2 mesh to 200 mesh.

The active material is capable of forming at least a partial coating on the particulate while being mixed with the particulate, thus "wetting" the surface of the particulate. In addition to wetting the surface of the particulate, the active material sufficiently adheres to the surface of the particulate such that it does not easily wash off by passing fluids, like during flowback of a fractured well. Preferably, the active material has the property of providing an oil-wet surface. More particularly, water, such as distilled water, can form a contact angle of greater than 90 degrees with a layer of the active material.

The active material can be selected from the group consisting of: a fluorocarbon; a cationic surfactant; and any combination in any proportion thereof. Preferably, the fluorocarbon comprises polytetrafluoroethylene (commonly known as Teflon®).

Some examples of cationic surfactants that can serve as active material include cationic surfactants found in U.S. Pat. Nos. 6,660,692 and 5,229,017, both which are incorporated by reference in their entirety. Other cationic surfactants include organic polyethylene, butoxylated glycol, ethoxylated-butoxylated glycols, alkyl-aminocarboxylic acids, and carboxylates. Without being limited by theoretical explanation, it is believed that the cationic surfactant is adsorbed onto the surface of the particulate, increasing the hydrophobicity of the particulate. Depending on the particular cationic surfactant used to oil-wet the particulate material, the cationic surfactant can eventually be washed off of the surface of the particulate by a sufficiently large volume of aqueous fluid. It may be desirable to provide a surfactant capable of remaining on the particulate surface long enough to achieve the desired results. In this way, the advantages of the active material can be realized over an extended period of time. The preferred cationic surfactants for the invention are relatively tenaciously bound to the surfaces, preventing re-adsorption of aqueous treatment fluid on the surface of the particulate during fracturing fluid cleanup, formation drainage, and hydrocarbon production processes, etc.

The active material can also comprise a tackifying compound, as disclosed in Halliburton's U.S. Pat. No. 5,775,415 filed Jul. 7, 1994; U.S. Pat. No. 5,787,986 filed Oct. 3, 1996; U.S. Pat. No. 5,833,000 filed Feb. 8, 1997; U.S. Pat. No. 5,839,510 filed Jan. 14, 1997; U.S. Pat. No. 5,871,049 filed May 21, 1998; U.S. Pat. No. 5,853,048 filed Apr. 21, 1988; and U.S. Pat. No. 6,047,772 filed Nov. 9, 1998, the entire disclosures of which are incorporated herein by reference in their entirety. Examples of such tackifying compounds include a condensation reaction product of dimmer acid containing some trimer and higher oligomers and some monomer acids with a polyamine. The tackifying compound can also comprise at least one member selected from the group consisting of ethelenediamine, diethlenetriamine, triethylenetetraamine, tetraethylene pentaamine, aminoethylpiperazine, and any combination in any proportion thereof. Also, the tackifying compound can comprise a liquid or solution of a polyamide. Without being limited by theoretical explanation, it is believed that the tackifying compound chemically binds to the particulate material, at least partially coating the particulate material. In this way, the coating formed on the particulate by the tackifying compound is not as easily removed from the particulate over time, and thus is particularly useful for long-term coating of the particulate material.

Preferably, the active material is in a fluid state while being mixed with the particulate, most especially in a liquid state. The active material can comprise a diluent to help liquefy the active material while being mixed with the particulate. The diluent can comprise at least one member selected from the group of butyl alcohol, isopropyl alcohol, xylene, toluene, heavy aromatic napha, ethyleneglycolmonobutylether, propylene, carbonate, n-methylpyrolidone, and any combination in any proportion thereof.

It is believed that for the purposes of resisting adhesion, it is not critical that the active material be a tackifying compound. Therefore, in one embodiment, the at least partially coated particulate does not increase the continuous critical resuspension velocity of the at least partially coated particulate by an amount in excess of about 30% when tested at a level of 0.5% active material by weight over the particulate alone with water.

The active material can be a solid at ambient surface conditions and upon initial simultaneous mixing with the particulate and after heating upon entry into the wellbore for introduction into the subterranean formation, becomes a melted liquid which at least partially coats the particulate.

The active material is introduced into the wellbore in an effective amount to obtain an at least partially coated particulate. For example, the active material amount is from about 0.05 to about 3.0 percent by weight of the particulate. Preferably, the active material amount is from about 0.1 to about 2 percent by weight of the particulate.

The invention provides mixing an active material with the particulate to obtain an at least partially coated particulate. The particulate can be mixed with the active material either at a remote location from the wellhead or at the wellhead of the wellbore. The particulate can be at least partially coated with the active material by several techniques. The dry coating method of adding a liquid material to a dry powder in a hopper that has a sand screw underneath it can also be used for mixing the active material with the particulate. The screw acts as a blending mechanism in the manner if a "mulling" action. While being conveyed to an outlet, the screw moves the solid in such a manner so that the liquid coats the dry particulate. This process is sufficiently finished as the coated particulate exits the tube housing the screw. The coated particulate then falls into a 'blender tub' which contains the viscous fluid used in the fracturing process. The active material can be introduced into a blender, metering pumps, or into any flowline in which the active material will contact the particulate to be at least partially coated prior to introducing the particulate in the subterranean formation. Although the invention is particularly advantageous when the particulate is pre-coated with the active material, it should be understood by those skilled in the art that the active material can also be simultaneously introduced into the formation with the particulate material to obtain an at least partially coated particulate. The active material can be incorporated with the entire quantity of the particulate introduced into the wellbore or it can be introduced with only a portion, such as in the final stage of the treatment. For example, the at least partially coated particulate can be added to only the final 20 to 30 percent of the treatment fluid introduced into the formation. In this instance, the intimate mixture will form a tail-in to the treatment. Furthermore, the active material can be introduced into the formation after the particulate has been injected into the formation. Subsequent injection of the active material after the injection of the particulate is particularly advantageous in gravel packing.

The particulate can be carried into the formation by means of a carrier fluid. The carrier fluid can be of any convenient source that does not undesirably interact with the active material. Preferably, the carrier fluid can comprise fresh water, unsaturated salt water, saturated salt water, seawater, natural brine, formulated brine, 0.5 to 7% KCl solution, and any combination of any of the foregoing in any proportion thereof. However, other representative soluble salts are the chloride, bromide, acetate and formate salts of potassium, sodium, calcium, magnesium and zinc. Preferably, mixing the at least partially coated particulate and a carrier fluid to obtain a treatment fluid comprises admixing the at least partially coated particulate to the carrier fluid.

The coated particulate is mixed with a carrier fluid to obtain a treatment fluid that is introduced into the subterranean formation through a wellbore. In this way, the particulate that is coated by the active material does not cause aqueous treatment fluid to adhere to the coated particulate; rather the treatment fluid freely passes through the coated particulate. Thus, the invention provides a method to increase the permeability of treatment fluid through the formation by at least partially coating the particulate with an active material that will resist adhesion of the treatment fluid onto the particulate.

The treatment fluid that is mixed with the at least partially coated particulate can also comprise of a polymeric material. Particularly in fracturing applications, the polymeric material in the treatment fluid can serve as a gelling agent and viscosities the fluid to create/extend the fracture and thicken the aqueous solution so as to be able to suspend the particulate or proppant for delivery into the fracture. The polymer can be selected from the group consisting of hydroxypropylguar, carboxymethylhydroxypropylguar, carboxymethylguar, hydroxyethyl cellulose, grafted hydroxyethyl cellulose, carboxymethyl cellulose, carboxymethylhydroxyethyl cellulose, polyacrylamides, galactomannan gums, glycomannan gums, and any combination and in any proportion thereof. In a fracturing fluid, the amount of polymeric material should be sufficient to produce the desired characteristics, in any given formation. For example, the polymeric material should be in a sufficient amount to maintain the particulate or proppant in suspension during their placement in the formation fractures. Preferably, the polymer is present in the treating fluid in an amount in the range of from about 0.2% to about 5% by weight of the carrier fluid.

The polymer(s) that can be used in the treatment fluid can be either crosslinked or uncrosslinked. A crosslinker is preferably selected from the group consisting of boron compounds, compounds that supply zirconium IV ions, compounds that supply titanium IV ions, aluminum compounds and compounds that supply antimony ions. Preferably, the crosslinker is present in said treating fluid in an amount in the range of from about 50 ppm to about 5000 ppm.

The treatment fluid that is mixed with the partially coated particulate can also comprise a breaker or delinker for causing the fluid to quickly revert to a thin fluid. Examples of a suitable breaker or delinker include, but are not limited to, a delayed breaker or delinker capable of lowering the pH of the treating fluid to cause the polymer crosslink to reverse. Examples of delayed breaker or delinker which can be used include, but are not limited to, various lactones, esters, encapsulated acids and slowly soluble acid generating compounds, oxidizers which produce acids upon reaction with water, water reactive metals such as aluminum, lithium and magnesium. Alternatively, any conventionally used breaker employed with metal ion crosslinker can be utilized such as, for example, sodium chlorite, sodium bromate, sodium persulfate, ammonium persulfate, encapsulated sodium persulfate, potassium persulfate, or ammonium persulfate and the like as well as magnesium peroxide. An enzyme breaker can include alpha and beta amylases, amyloglucosidase, invertase, maltase, cellulase and hemicellulase is preferred. The breaker or delinker is included in the treating or fracturing fluid in an amount in the range of from about 0% to about 2% by weight of water therein.

Additional materials in the treatment fluid that is mixed with the at least partially coated particulate can include, but is not limited to, a pH adjusting compound for elevating the pH of the fluid, a buffer, a surfactant for preventing the formation of emulsions between the treatment fluid and subterranean formation fluids, a clay stabilizer, a fluid loss control agent, dispersing agents, corrosion inhibitors, scale inhibitors, bactericides, breaker activators, etc. The treatment fluid can also include certain surfactants to improve or facilitate the wetting of particulate by the active material. It is to be understood that none of the additional materials should adversely affect the ability of the active material in this application to coat the particulate.

The treatment fluid that is mixed with the coated particulate can also include materials for retarding the movement of the particulate introduced in the fluid within the created fracture. For example, materials in the form of fibers, flakes, ribbons, beads, shavings, platelets and the like comprised of glass, ceramics, carbon composite, natural or synthetic polymers or metals, nut hulls, and the like can be mixed with the treatment fluid introduced into the subterranean formation to retard or prevent the movement of the introduced proppant. A more detailed description of the forgoing materials is disclosed in, for example, U.S. Pat. Nos. 5,330,005; 5,439,055; and 5,501,275, the entire disclosures of which are incorporated herein by reference.

In one aspect of the present invention, the treatment fluid is introduced into the subterranean formation through the wellbore at a sufficient pressure to create a fracture in the subterranean formation. In this aspect of the invention, at least a portion of the treatment fluid's carrier fluid can be flowed back. Preferably, at least 20% of the treatment fluid's carrier fluid is flowed back. More preferably, at least 75% of the treatment fluid's carrier fluid is flowed back. Hydrocarbon can then be produced from the formation. Thus, the invention can be applied to fracturing fluids that include a water base fluid, an acid base fluid, and a hydrocarbon base fluid.

In another aspect of the invention, the particulate is introduced into the wellbore to form a gravel pack. Thus, the invention also includes applications of gravel packing fluids comprised of aqueous fluid, aqueous foam, a hydrocarbon fluid or an emulsion, and sand consolidation methods. The invention can also be applied to foam treatments. The treatment fluid can include any of the conventionally known foaming agents that do not adversely react with the treatment fluid such as gaseous compounds like nitrogen, air, carbon dioxide or another gaseous compound that is mixed with the fluid to form a foam for introduction into the subterranean formation.

The invention also provides a method of treating a subterranean formation penetrated by a wellbore, the method comprising the steps of: 1) mixing a particulate and an active material to obtain an at least partially coated particulate; 2) mixing the at least partially coated particulate and a carrier fluid to obtain a treatment fluid, wherein the active material is capable of resisting adhesion of the carrier fluid onto the particulate; and 3) introducing the treatment fluid into the subterranean formation through the wellbore to deposit the at least partially coated particulate into the subterranean formation.

Further, the invention provides a method of treating a subterranean formation penetrated by a wellbore, the method comprising the step of mixing a particulate and an active material to obtain an at least partially coated particulate, wherein: water forms a contact angle of less than 90 degrees with a surface of the particulate, the active material is capable of forming a coating on the particulate, the active material forms a contact angle less than 90 degrees with the particulate, and water forms a contact angle of greater than 90 degrees with a layer of the active material. The method further includes the steps of mixing the at least partially coated particulate and a carrier fluid to obtain a treatment fluid and introducing the treatment fluid into the subterranean formation through the wellbore to deposit the at least partially coated particulate into the subterranean formation.

These methods can also include flowing back at least a portion of the carrier fluid after the step of introducing the treatment fluid into the subterranean formation. Preferably, at least 20% of the carrier fluid is flowed back. More preferably, a greater percent of the carrier fluid is flowed back; for example, at least 75% of the carrier fluid can be flowed back. Also, the step of producing hydrocarbon the wellbore can follow flowing back at least a portion of the carrier fluid.

Because the porosity in a matrix the size of a proppant pack is directly proportional to permeability of that pack, it should be understood by those skilled in the art that the methods of the present invention can include a step of increasing the porosity of the proppant pack in low stress environments in efforts to increase permeability.

It is understood by those skilled in the art that sometimes an oil-based or a multi-phase treatment or fracturing fluid is desirable. In such applications, it is within the scope of the invention to at least partially coat the particulate with a water-wetting agent. In this way, the oil-based treatment fluid is easily flowed out of the formation without hindrance from the water-wet proppants.

After careful consideration of the specific and exemplary embodiments of the invention described herein, a person of ordinary skill in the art will appreciate that certain modifications, substitutions and other changes may be made without substantially deviating from the principles of the invention. The detailed description is illustrative, the spirit and scope of the invention being limited only by the appended Claims.

What is claimed is:

1. A method of treating a subterranean formation penetrated by a wellbore, the method comprising the steps of:
   a. mixing a particulate and a carrier fluid to obtain a treatment fluid;
   b. introducing the treatment fluid into the subterranean formation through the wellbore to deposit the particulate into the subterranean formation; and
   c. mixing the particulate and an active material to obtain an at least partially-coated particulate, wherein the active material is introduced into the formation after the particulate has been injected into the formation to obtain the at least partially-coated particulate;

wherein the active material is in a fluid state while being mixed with the particulate; and wherein the active material comprises a fluorocarbon.

2. The method according to claim 1, further comprising the step of: flowing back at least a portion of the carrier fluid from the wellbore.

3. The method according to claim 1, wherein: (i) water forms a contact angle of less than 90 degrees with a surface of the particulate, (ii) the active material is capable of forming a coating on the particulate, (iii) the active material forms a contact angle less than 90 degrees with the particulate, and (iv) water forms a contact angle of greater than 90 degrees with a layer of the active material.

4. A method of treating a subterranean formation penetrated by a wellbore, the method comprising the steps of:
   a. mixing a particulate and a carrier fluid to obtain a treatment fluid;
   b. introducing the treatment fluid into the subterranean formation through the wellbore to deposit the particulate into the subterranean formation; and
   c. mixing the particulate and an active material to obtain an at least partially-coated particulate, wherein the active material is a solid at ambient surface conditions and upon initial mixing with the particulate;

wherein the active material after entry into the wellbore for introduction into the subterranean formation, becomes a melted liquid to obtain the at least partially-coated particulate; and wherein the active material comprises a fluorocarbon.

5. The method according to claim 4, further comprising the step of: flowing back at least a portion of the carrier fluid from the wellbore.

6. The method according to claim 4, wherein: (i) water forms a contact angle of less than 90 degrees with a surface of the particulate, (ii) the active material is capable of forming a coating on the particulate, (iii) the active material forms a contact angle less than 90 degrees with the particulate, and (iv) water forms a contact angle of greater than 90 degrees with a layer of the active material.

7. The method according to claim 1, 3, 4, or 6, wherein the active material does not increase the continuous critical resuspension velocity of the at least partially-coated particulate by an excess of about 30 percent when tested at a level of 0.5% active material by weight over the particulate alone with water.

8. The method according to claim 2 or 5, wherein the step of flowing back at least a portion of the carrier fluid comprises flowing back at least 75% of the carrier fluid.

9. The method according to claim 2 or 5, further comprising the step of producing hydrocarbon from the wellbore after flowing back at least a portion of the carrier fluid.

10. The method according to claim 3 or 6, wherein the particulate is selected from the group consisting of sand, sintered bauxite, ceramic, glass, and any combination in any proportion thereof.

11. The method according to claim 3 or 6, wherein the active material comprises tetrafluoroethylene.

12. The method according to claim 3 or 6, wherein the active material amount is from about 0.05 to about 3.0 percent by weight of the particulate.

13. The method according to claim 4 or 6, wherein the active material further comprises a diluent to help liquefy the active material while being mixed with the particulate.

\* \* \* \* \*

UNITED STATES PATENT AND TRADEMARK OFFICE
CERTIFICATE OF CORRECTION

PATENT NO. : 7,595,281 B2
APPLICATION NO. : 11/132022
DATED : September 29, 2009
INVENTOR(S) : McDaniel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 715 days.

Signed and Sealed this

Twenty-eighth Day of September, 2010

David J. Kappos
*Director of the United States Patent and Trademark Office*